(12) United States Patent
Gill

(10) Patent No.: US 6,781,798 B2
(45) Date of Patent: Aug. 24, 2004

(54) CPP SENSOR WITH DUAL SELF-PINNED AP PINNED LAYER STRUCTURES

(75) Inventor: Hardayal Singh Gill, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 33 days.

(21) Appl. No.: 10/196,310

(22) Filed: Jul. 15, 2002

(65) Prior Publication Data

US 2004/0008450 A1 Jan. 15, 2004

(51) Int. Cl.$^7$ .............................................. G11B 5/39
(52) U.S. Cl. ..................................................... 360/314
(58) Field of Search ........................... 360/314, 324.11, 360/324.12, 324.2

(56) References Cited

U.S. PATENT DOCUMENTS

| | | | |
|---|---|---|---|
| 4,663,607 A | 5/1987 | Kitada et al. .............. | 338/32 H |
| 5,583,725 A | 12/1996 | Coffey et al. ................ | 360/113 |
| 5,627,703 A | 5/1997 | Smith .......................... | 360/113 |
| 5,648,885 A | 7/1997 | Nishioka et al. ............. | 360/113 |
| 5,768,069 A | 6/1998 | Mauri .......................... | 360/113 |
| 5,891,586 A | 4/1999 | Hasegawa et al. ........... | 428/668 |
| 6,052,263 A | 4/2000 | Gill .............................. | 360/113 |
| 6,117,569 A | 9/2000 | Lin et al. ..................... | 428/692 |
| 6,118,624 A | 9/2000 | Fukuzawa et al. ........... | 360/113 |
| 6,122,150 A | 9/2000 | Gill ......................... | 360/324.11 |
| 6,127,045 A | 10/2000 | Gill .............................. | 428/611 |
| 6,127,053 A | 10/2000 | Lin et al. ..................... | 428/692 |
| 6,157,523 A | 12/2000 | Kikuchi et al. ........ | 360/324.11 |
| 6,168,860 B1 | 1/2001 | Daughton ................... | 428/332 |
| 6,178,074 B1 | 1/2001 | Gill ......................... | 360/324.2 |

(List continued on next page.)

FOREIGN PATENT DOCUMENTS

| | | | | |
|---|---|---|---|---|
| EP | 0971423 | 1/2000 | .......... | H01L/43/12 |
| JP | 9092905 | 4/1997 | .......... | H01L/43/08 |
| JP | 2000276720 | 10/2000 | ............ | G11B/5/39 |
| JP | 2001156358 | 6/2001 | .......... | H01L/43/08 |
| WO | WO 00/19226 | 4/2000 | .......... | G01R/33/09 |
| WO | WO 01/23903 | 4/2001 | .......... | G01R/33/09 |

OTHER PUBLICATIONS

*IEEE Trans. on Magnetics*, vol. 35, No. 2, Mar. 1999, "Spin Valve and Dual Spin Valve Heads with Synthetic Antiferromagnets".

*Journal of Applied Physics*, vol. 89, No. 11, Jun. 1, 2001, "Giant magnetoresistance properties of specular spin valve films in a current perpendicular to plane structure".

*Research Disclosure*. No. 432113, Apr. 2000, p. 745, "Signal asymmetry control for GMR heads".

*Journal of Magnetics Society of Japan*, vol. 25, No. 4, pt. 2, p. 807–10, 2001, "Giant magnetoresistance properties of spin valve films in Current–perpendicular–to–plane geometry".

*Primary Examiner*—A. J. Heinz
*Assistant Examiner*—Angel Castro
(74) *Attorney, Agent, or Firm*—Ervin F. Johnston

(57) ABSTRACT

A CPP sensor includes a free layer which is located between first and second spacer layers and the first and second spacer layers are located between first and second AP pinned layer structures. Each of the AP pinned layer structures has first and second AP pinned layers with the first AP pinned layer of the first AP pinned layer structure interfacing the first spacer layer and the first AP pinned layer of the second AP pinned layer structure interfacing the second spacer layer. The second AP pinned layer of each of the first and second AP pinned layer structures is composed of a material which causes each AP pinned layer structure to be self-pinned. This eliminates the need for first and second antiferromagnetic (AFM) pinning layers so that the gaps of a read head employing the sensor and the resistance of the sensor are reduced to increase the linear read bit density of the read head and the magnetoresistive coefficient of the sensor respectively.

42 Claims, 9 Drawing Sheets

U.S. PATENT DOCUMENTS

| | | |
|---|---|---|
| 6,185,080 B1 | 2/2001 | Gill .......................... 360/324.2 |
| 6,191,926 B1 * | 2/2001 | Everitt et al. .......... 360/324.11 |
| 6,219,208 B1 | 4/2001 | Gill .......................... 360/324.1 |
| 6,243,288 B1 * | 6/2001 | Ishikawa et al. ............. 365/158 |
| 6,252,796 B1 | 6/2001 | Lenssen et al. ............. 365/173 |
| 6,271,997 B1 | 8/2001 | Gill ............................. 360/314 |
| 6,275,363 B1 | 8/2001 | Gill .......................... 360/324.2 |
| 6,317,297 B1 | 11/2001 | Tong et al. ................. 360/314 |
| 6,327,122 B1 | 12/2001 | Pinarbasi ............... 360/324.11 |
| 6,469,878 B1 * | 10/2002 | Mack et al. ............ 360/324.12 |
| 6,490,140 B1 * | 12/2002 | Mao et al. ............. 360/324.11 |
| 6,621,664 B1 * | 9/2003 | Trindade et al. ............. 360/318 |
| 6,643,103 B1 * | 11/2003 | Trindade .................... 360/314 |
| 2001/0006443 A1 | 7/2001 | Maruyama et al. ......... 360/314 |
| 2001/0026470 A1 | 10/2001 | Gillies et al. ............... 365/158 |
| 2001/0030839 A1 | 10/2001 | Zhong et al. ............... 360/314 |
| 2001/0030842 A1 | 10/2001 | Pinarbasi ............... 360/324.11 |

* cited by examiner

CPP SENSOR WITH DUAL SELF-PINNED AP PINNED LAYER STRUCTURES

BACKGROUND OF THE INVENTION

1. Field of the Invention

The present invention relates to a current perpendicular to the planes (CPP) sensor with dual self-pinned AP pinned layer structures wherein the CPP sensor is either a CPP spin valve sensor or a tunnel junction sensor.

2. Description of the Related Art

The heart of a computer is typically a magnetic disk drive which includes a rotating magnetic disk, a slider that has write and read heads, a suspension arm above the rotating disk and an actuator arm. The suspension arm biases the slider into contact with a parking ramp or the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a current perpendicular to the planes (CPP) sensor for sensing the magnetic field signals from the rotating magnetic disk. The sensor includes a nonmagnetic electrically conductive or electrically nonconductive layer sandwiched between a ferromagnetic pinned layer and a ferromagnetic free layer. An antiferromagnetic pinning layer typically interfaces the pinned layer for pinning the magnetic moment of the pinned layer 90° to an air bearing surface (ABS) wherein the ABS is an exposed surface of the sensor that faces the rotating disk. The sensor is located between ferromagnetic first and second shield layers. First and second leads are connected to a bottom and a top respectively of the sensor for conducting a current perpendicular to the major thin film planes (CPP) of the sensor. This is in contrast to a CIP sensor where the current is conducted in plane parallel to the major thin film planes (CIP) of the sensor. A magnetic moment of the free layer is free to rotate upwardly and downwardly with respect to the ABS from a quiescent or zero bias point position in response to positive and negative magnetic field signals from the rotating magnetic disk. The quiescent position of the magnetic moment of the free layer, which is parallel to the ABS, is when the current is conducted through the sensor without magnetic field signals from the rotating magnetic disk.

When the aforementioned spacer layer is nonmagnetic and electrically conductive, such as copper, the current is referred to as a sense current, but when the spacer layer is nonmagnetic and electrically nonconductive, such as aluminum oxide, the current is referred to as a tunneling current. Hereinafter, the current is referred to as a perpendicular current ($I_P$) which can be either a sense current or a tunneling current.

When the magnetic moments of the pinned and free layers are parallel with respect to one another the resistance of the sensor to the perpendicular current ($I_P$) is at a minimum and when their magnetic moments are antiparallel the resistance of the sensor to the perpendicular current ($I_P$) is at a maximum. Changes in resistance of the sensor is a function of cos θ, where θ is the angle between the magnetic moments of the pinned and free layers. When the perpendicular current ($I_P$) is conducted through the sensor, resistance changes, due to field signals from the rotating magnetic disk, cause potential changes that are detected and processed as playback signals. The sensitivity of the sensor is quantified as magnetoresistive coefficient dr/R where dr is the change in resistance of the sensor from minimum resistance (magnetic moments of free and pinned layers parallel) to maximum resistance (magnetic moments of the free and pinned layers antiparallel) and R is the resistance of the sensor at minimum resistance.

Sensors are classified as a bottom sensor or a top sensor depending upon whether the pinned layer is located near the bottom of the sensor close to the first read gap layer or near the top of the sensor close to the second read gap layer. Sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel. Sensors are still further classified as single or dual wherein a single sensor employs only one pinned layer and a dual sensor employs two pinned layers with the free layer structure located therebetween.

The first and second shield layers may engage the bottom and the top respectively of the CPP sensor so that the first and second shield layers serve as the aforementioned leads for conducting the perpendicular current through the sensor perpendicular to the major planes of the layers of the sensor. The read gap is the length of the sensor between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

Assuming that the aforementioned pinning layers are platinum manganese (PtMn) each pinning layer has a thickness of approximately 150 Å which increases the read gap in a dual CPP sensor by 300 Å. This seriously impacts the linear read bit density of the read head. Further, the pinning layers significantly increase the resistance R of the sensor to the perpendicular current ($I_P$). The result is that the magnetoresistive coefficient dr/R of the sensor is decreased. The pinning layers also require extra steps in their fabrication and a setting process. After forming the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to ambient temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields not disturb the setting of the pinning layer.

SUMMARY OF THE INVENTON

An aspect of the invention is to employ a dual CCP sensor for increasing the magnetoresistive coefficient dr/R of the read head. In the dual CPP sensor first and second pinned layer structures are employed with a first spacer layer between the first pinned layer structure and the free layer and a second spacer layer between the second pinned structure and the free layer. With this arrangement the magnetoresistive (MR) effect is additive on each side of the free layer to increase the magnetoresistive coefficient dr/R of the read head. In order to reduce demagnetizing fields $H_D$ from the first and second pinned layers on the free layer, each of the pinned layers is an antiparallel (AP) pinned layer structure. The first AP pinned layer structure has an antiparallel coupling (APC) layer which is located between ferromagnetic first and second AP pinned layers (AP1) and (AP2) and the second AP pinned layer structure has another antiparallel coupling layer which is located between another first and second AP pinned layers (AP1) and (AP2). The AP pinned layers of each AP pinned layer structure have magnetic moments which are antiparallel with respect to one another because of a strong antiferromagnetic coupling therebetween. The AP pinned layer structure is filly described in commonly assigned U.S. Pat. No. 5,465,185 which is incorporated by reference herein. Because of the partial flux closure between the AP pinned layers of each first and second AP pinned layer structures, each AP pinned layer structure exerts a small demagnetizing field on the free layer.

The first AP pinned layer of the first AP pinned layer structure interfaces the first spacer layer and the first AP pinned layer of the second AP pinned layer structure interfaces the second spacer layer. In order for the aforementioned MR effect to be additive on each side of the free layer it is important that the AP pinned layer structures be in-phase with respect to one another. This occurs when the magnetic moments of the first AP pinned layers of the first and second AP pinned layer structures are oriented perpendicular to the ABS and parallel with respect to one another. Accordingly, when a signal field from a rotating magnetic disk rotates the free layer structure the change in resistance of the sensor due to the magnetoresistive coefficient will be additive to increase the signal output of the read head.

Another aspect of the invention is that the AP pinned layer structures are self-pinned which eliminates the aforementioned first and second pinning layers. By eliminating the pinning layers the read gap can be reduced by at least 300 Å so that the linear read bit density of the read head is increased. Further, by eliminating the pinning layers the resistance R of the sensor is decreased so that the magnetoresistive coefficient dr/R is increased. It is preferred that the first AP pinned layer of each AP pinned layer structure next to a respective spacer layer be cobalt iron ($Co_{90}Fe_{10}$) for improving the magnetoresistive coefficient dr/R of the sensor. The second AP pinned layer of each AP pinned layer structure, however, is composed of a different material for implementing the self-pinning feature. In one aspect of the invention the material of the second AP pinned layers is magnetocrystalline $M_C$ which has a high uniaxial anistotropy $H_K$ and in another aspect of the invention the material of the second AP pinned layer is highly magnetostrictive ($M_S$) which is face centered cube (FCC). Preferred materials for the magnetocrystalline AP pinned layers, which is hexagonal closed packed, are cobalt (Co), cobalt platinum ($CO_{75}Pt_{25}$) and cobalt samarium ($CO_{80}Sm_{20}$). Preferred materials for the highly magnetostrictive $M_S$ AP pinned layers are cobalt iron ($CO_{50}Fe_{50}$) and nickel iron ($Ni_{45}Fe_{55}$). Commonly assigned U.S. Pat. No. 6,127,053 is incorporated in its entirety regarding self-pinned AP pinned layer structures.

An object of the present invention is to provide a CPP sensor with dual self-pinned AP pinned layer structures.

Another object is to provide a CPP sensor with dual self-pinned AP pinned layer structures wherein the second AP pinned layer of each AP pinned layer structure is composed of a high magnetocrystalline material $M_C$ or a high magnetostriction material $M_S$ for implementing the self-pinning function.

Still another object is to provide a CPP sensor with a single self-pinned AP pinned layer structure wherein the second AP pinned layer of the pinned layer structure is composed of a high magnetocrystalline material $M_C$ or a high magnetostriction material $M_S$.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
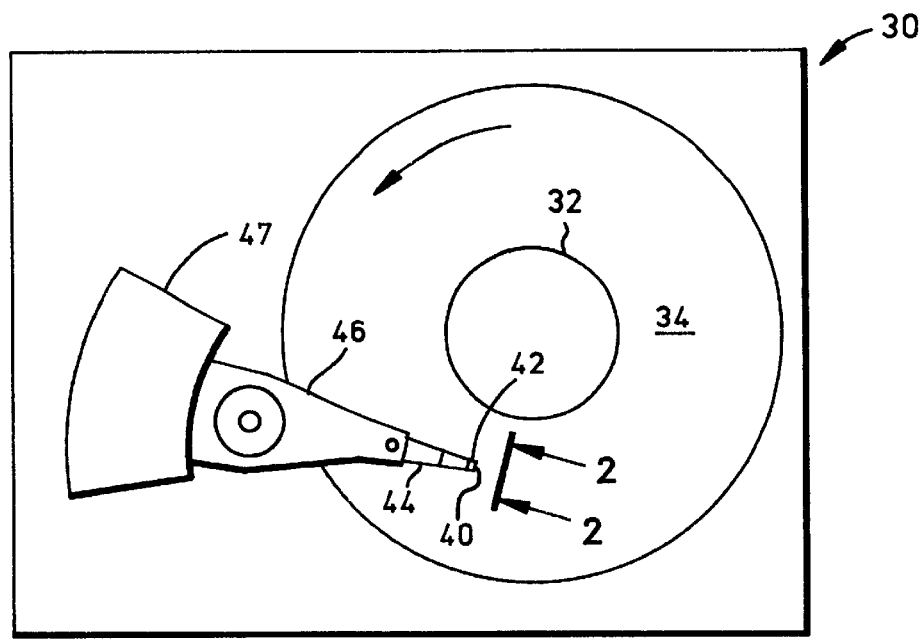
FIG. 1 is a plan view of an exemplary prior art magnetic disk drive.
Figure 2:
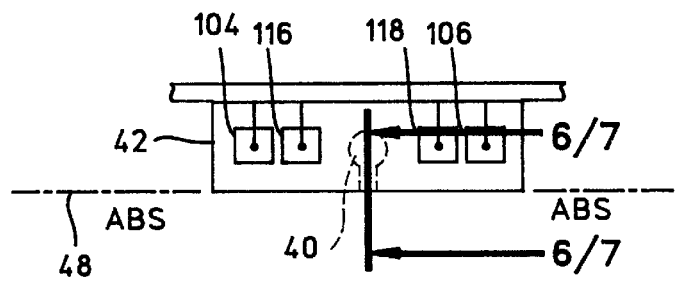
FIG. 2 is an end view of a slider with a magnetic head of the disk drive as seen in plane 2—2 of FIG. 1.
Figure 3:
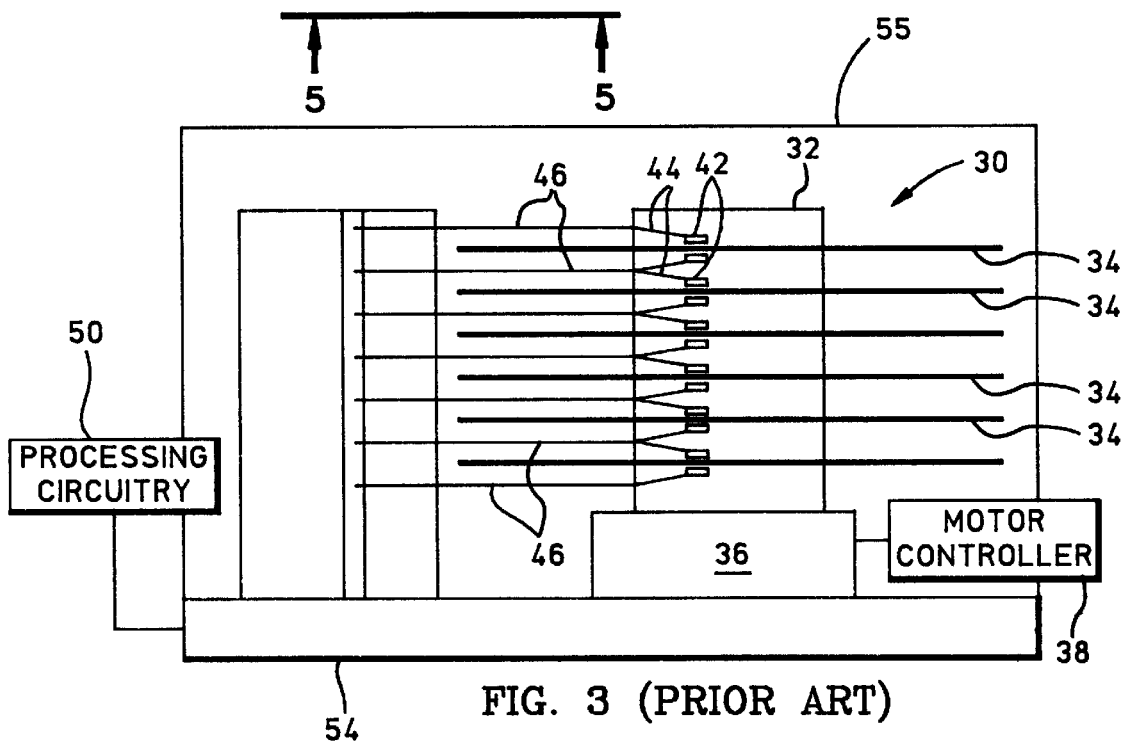
FIG. 3 is an elevation view of the magnetic disk drive wherein multiple disks and magnetic heads are employed.
Figure 4:
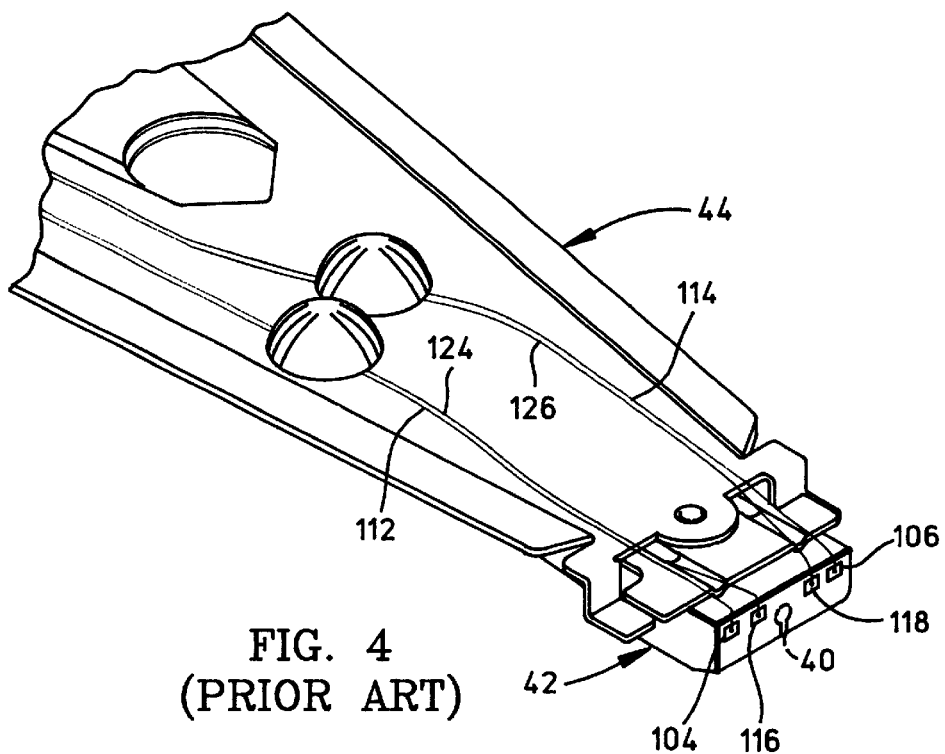
FIG. 4 is an isometric illustration of an exemplary prior art suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
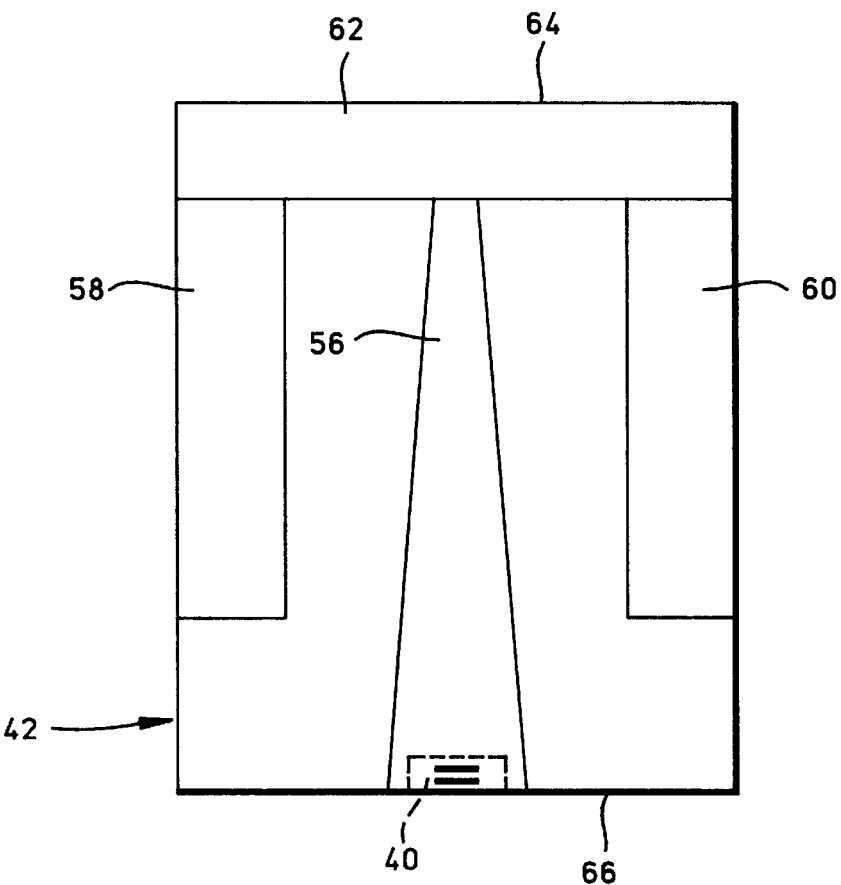
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
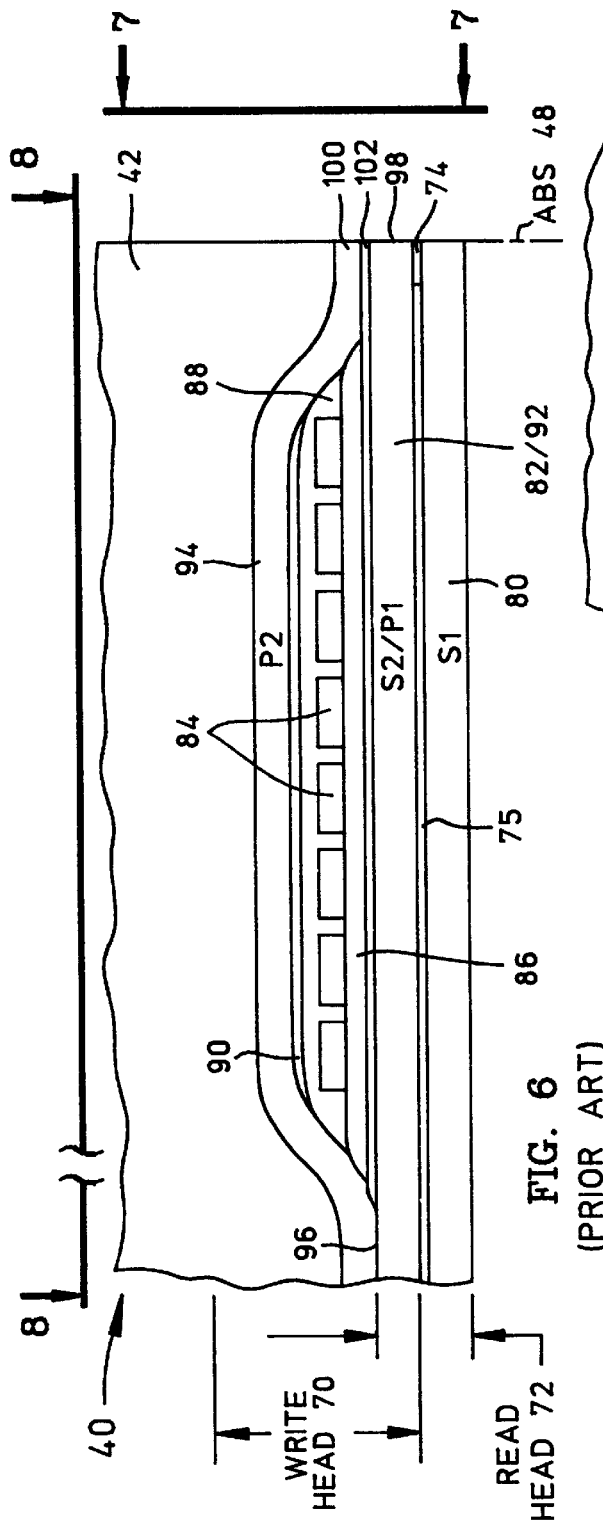
FIG. 6 is a partial view of the slider and a merged magnetic head as seen in plane 6—6 of FIG. 2.
Figure 7:
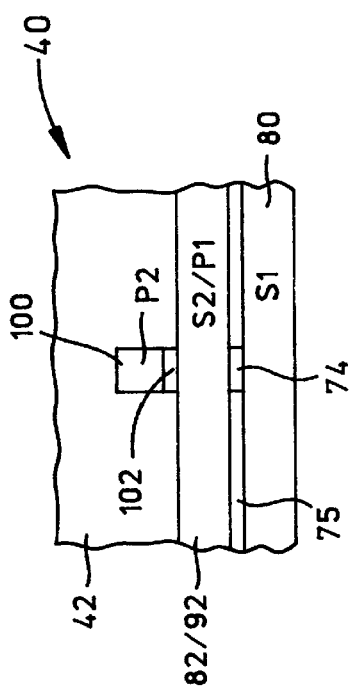
FIG. 7 is a partial ABS view of the slider taken along plane 7—7 of FIG. 6 to show the read and write elements of the magnetic head.

FIG. 6 is a side cross-sectional elevation view of a merged magnetic head 40, which includes a write head portion 70 and a read head portion 72, the read head portion employing a CPP sensor 74. FIG. 7 is an ABS view of FIG. 6. The CPP sensor 74 is sandwiched between ferromagnetic first and second shield layers 80 and 82 which may serve as first and second leads connected to the processing circuitry 50 in FIG. 3 for conducting a perpendicular current $I_P$ through the sensor perpendicular to major planes of the layers of the sensor. In response to external magnetic fields, the resistance of the sensor 74 changes. When the current $I_P$ is conducted through the sensor the resistance changes cause potential changes which are processed as readback signals by the processing circuitry 50 shown in FIG. 3.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
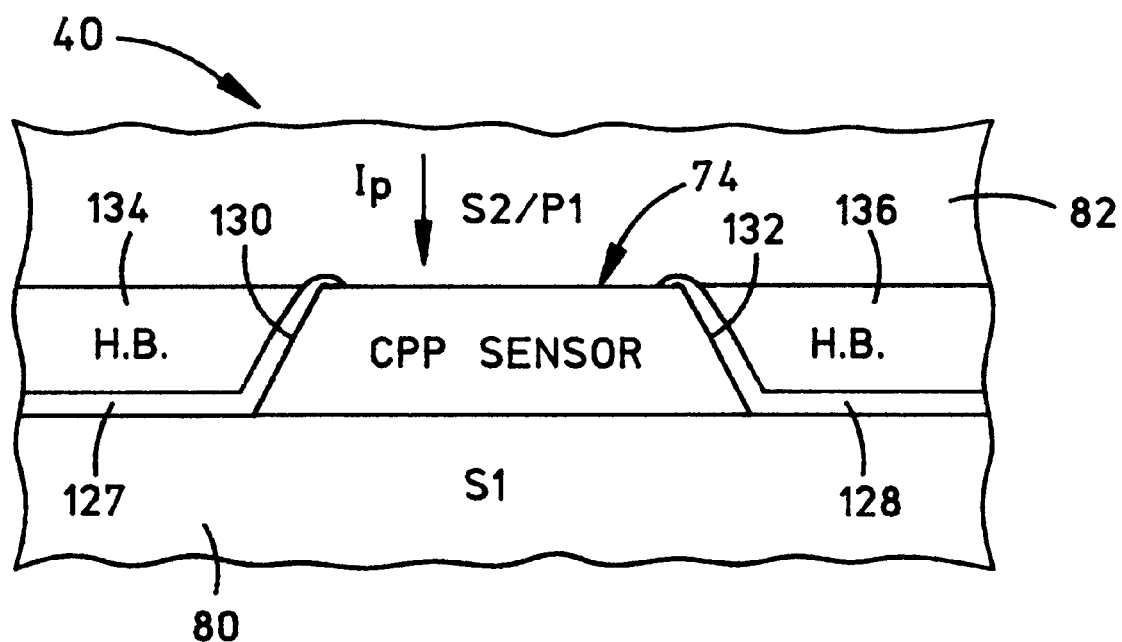
FIG. 9 is an enlarged isometric ABS illustration of a read head which has a CPP sensor.

FIG. 9 is an enlarged isometric ABS illustration of the prior art read head portion shown in FIG. 7. The read head includes the CPP sensor 74. First and second insulation layers 127 and 128, such as alumina ($Al_2O_3$), cover the first shield layer 80 on each side of the sensor 74 as well as slightly covering first and second side walls 130 and 132 of the sensor. First and second hard bias layers (H.B.) 134 and 136 are on the insulation layers 127 and 128 and are adjacent the side walls 130 and 132. The hard bias layers 134 and 136 cause magnetic fields to extend longitudinally through the sensor 74 for stabilizing the free layer. The sensor 74 and the first and second hard bias layers 134 and 136 are located between ferromagnetic first and second shield layers 80 and 82 which may serve as leads for conducting the perpendicular current ($I_P$) through the sensor 74.

The Invention

Figure 10:
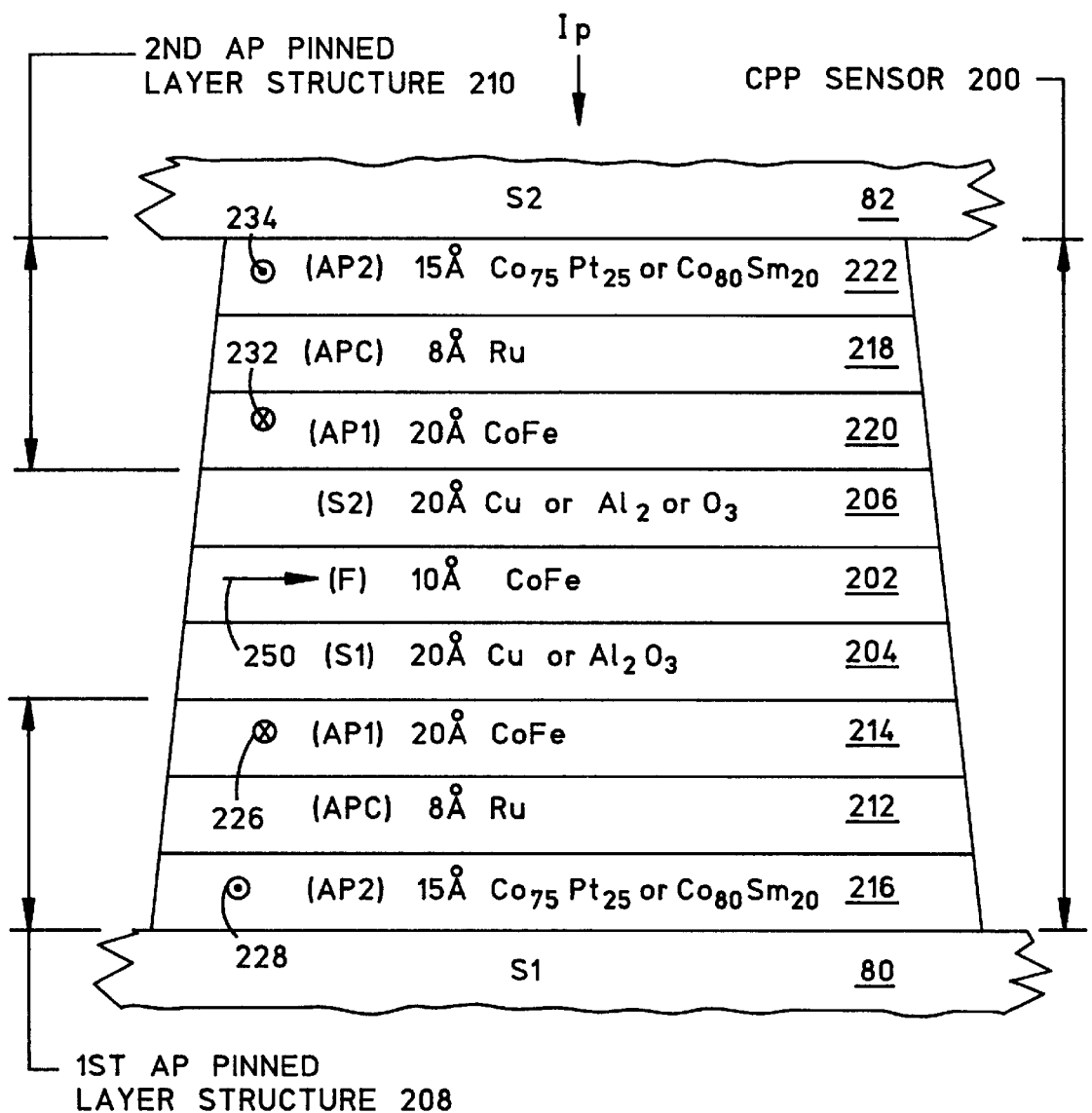
FIG. 10 is an ABS illustration of a first embodiment of the present dual CPP sensor.

FIG. 10 is an ABS illustration of a first embodiment of the present dual AP pinned CPP sensor 200. In this embodiment a free layer (F) 202 is located between first and second spacer layers (S1) and (S2) 204 and 206. The first and second spacer layers 204 and 206 are, in turn, located between first and second AP pinned layer structures 208 and 210. The first AP pinned layer structure 208 includes an antiparallel coupling (APC) layer 212 which is located between ferromagnetic first and second AP pinned layers (AP1) and (AP2) 214 and 216. The second AP pinned layer structure 210 includes an antiparallel coupling (APC) layer 218 which is located between ferromagnetic first and second AP pinned layers (AP1) and (AP2) 220 and 222.

The first and second AP pinned layers 214 and 216 of the first AP pinned layer structure have magnetic moments 226 and 228 respectively and the AP pinned layers 220 and 222 of the second AP pinned layer structure have magnetic moments 232 and 234 respectively which are set in-phase with respect to one another. The free layer 202 has a magnetic moment 250 which is oriented parallel to the ABS and parallel to the major planes of the AP pinned layers in a direction from either right to left or from left to right, as shown in FIG. 10. When a signal field from the rotating magnetic disk rotates the magnetic moment 250 of the free layer into the sensor the magnetic moment 250 becomes more parallel with respect to the magnetic moments 226 and 232, which decreases the resistance of the sensor to a perpendicular current $I_P$, and when a signal field rotates the magnetic moment 250 of the free layer out of the sensor the magnetic moment 250 becomes more antiparallel with respect to the magnetic moments 226 and 232 which increases the resistance of the sensor. These resistance changes are processed as playback signals by the processing circuitry 50 shown in FIG. 3. It should be noted that the processing circuitry 50 in FIG. 3 supplies the current $I_P$ to the sensor.

Each of the AP pinned layer structures 208 and 210 is self-pinned thereby eliminating two antiferromagnetic (AFM) pinning layers in the stack of the sensor 200. This significantly reduces the height of the sensor stack and the distance between the first and second shield layers 80 and 82. Accordingly, a very narrow read gap is provided for significantly increasing the linear read bit density of the read head. Further, by eliminating the pinning layers the resistance of the sensor to the perpendicular current $I_P$ is significantly reduced so that the magnetoresistive coefficient dr/R of the sensor is significantly increased. The first AP pinned layers 214 and 220 of each of the AP pinned layer structures 208 and 210 is preferably cobalt iron ($Co_{90}Fe_{10}$). This material next to the spacer layers 204 and 206 increases the magnetoresistive coefficient dr/R of the sensor. However, the second AP pinned layers 216 and 222 are composed of a different material for implementing the self-pinning function of the AP pinned layer structures 208 and 210.

In a first aspect of the invention the material of each of the second AP pinned layers 216 and 222 is a hexagonal closed packed magnetocrystalline ($M_C$) material which has a high uniaxial anisotropy $H_K$. Preferred magnetocrystalline materials are cobalt, cobalt platinum ($CO_{75}Pt_{25}$) and cobalt samarium ($CO_{80}Sm_{20}$). The magnetic moments 226 and 228 of the first AP pinned layer structure are very strongly antiparallel coupled together and the magnetic moments 232 and 234 of the second AP pinned layer structure are also very strongly antiparallel coupled together. This means that any extraneous field rotating either of the magnetic moments 226 and 228 result in the magnetic moments 226 and 228 rotating together and in the same manner any extraneous field rotating either of the magnetic moments 232 and 234 will cause these magnetic moments to rotate together. However, because of the high uniaxial anisotropy $H_K$ of the magnetic moments 228 and 234, all of these magnetic moments 226, 228, 232 and 234 are highly resistive to any movement in the presence of an extraneous field. Fabrication of the second AP pinned layers 228 and 234 is accomplished by sputtering these layers in the presence of a field which is oriented perpendicular to the ABS. This develops the easy axis of each of the AP pinned layers 228 and 234 perpendicular to the ABS and, after setting the orientation of the magnetic moments 228 and 234 either into the sensor or out of the sensor as shown in FIG. 10, the magnetic moments of the second AP pinned layers will resist rotation in the presence of extraneous fields. This aspect of the invention eliminates the need for a pining layer.

If desired, a chromium (Cr) seed layer may be employed between the layers 216 and 80 for improving the structure of the layers formed on the seed layer.

Figure 11:
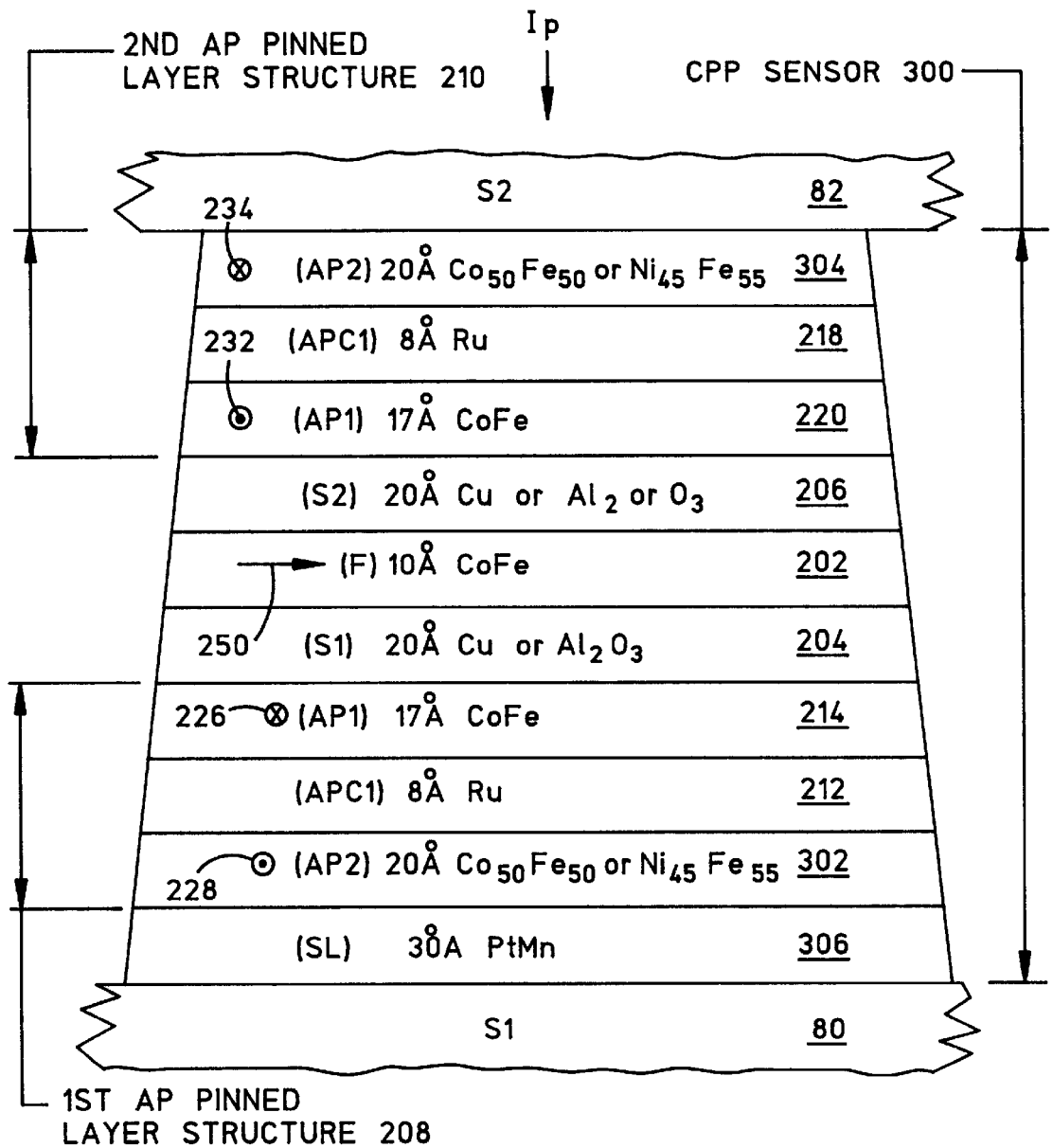
FIG. 11 is an ABS illustration of a second embodiment of the present dual CPP sensor.

FIG. 11 is an ABS illustration of another embodiment of the present sensor 300 which is the same as the sensor 200 in FIG. 10 except for second AP pinned layers (AP2) 302 and 304 which have a different composition than the second AP pinned layers 216 and 222 in FIG. 10. The composition of the second AP pinned layers 302 and 304 is face center cubed (FCC) with a high positive magnetostriction $M_S$. A high positive magnetostriction of the second AP pinned layers 302 and 304 results in the magnetic moments 228 and 234 being oriented perpendicular to the ABS. This orientation likewise orients the magnetic moments 226 and 232 perpendicular to the ABS and antiparallel thereto. This second aspect of the invention maintains the orientations of the magnetic moments of the AP pinned layers perpendicular to the ABS in the presence of an extraneous magnetic field which likewise eliminates the need for the pinning layers. Preferred materials for the high magnetostriction $M_S$ are cobalt iron ($CO_{50}Fe_{50}$) and nickel iron ($Ni_{45}Fe_{55}$).

A preferred material for the free layer 202 is cobalt iron or a cobalt iron alloy, such as cobalt iron nickel (CoFeNi). Each of the spacer layers 204 and 206 is copper (Cu) if the CPP sensor is a CPP spin valve sensor and is aluminum oxide ($Al_2O_3$) if the CPP sensor is a tunnel junction sensor. If the sensor is a CPP spin valve sensor the perpendicular current $I_P$ is a sense current and if the spacer layers 204 and 206 are aluminum oxide ($Al_2O_3$) and the perpendicular current $I_P$ is a tunneling current ($I_T$). Each of the antiparallel coupling layers 212 and 218 may be ruthenium (Ru). Exemplary thicknesses of the layers are illustrated in FIG. 10. A seed layer (SLY) 306 may be employed between layers 302 and 80 for improving the structure of the layers formed on the seed layer.

Figure 12:
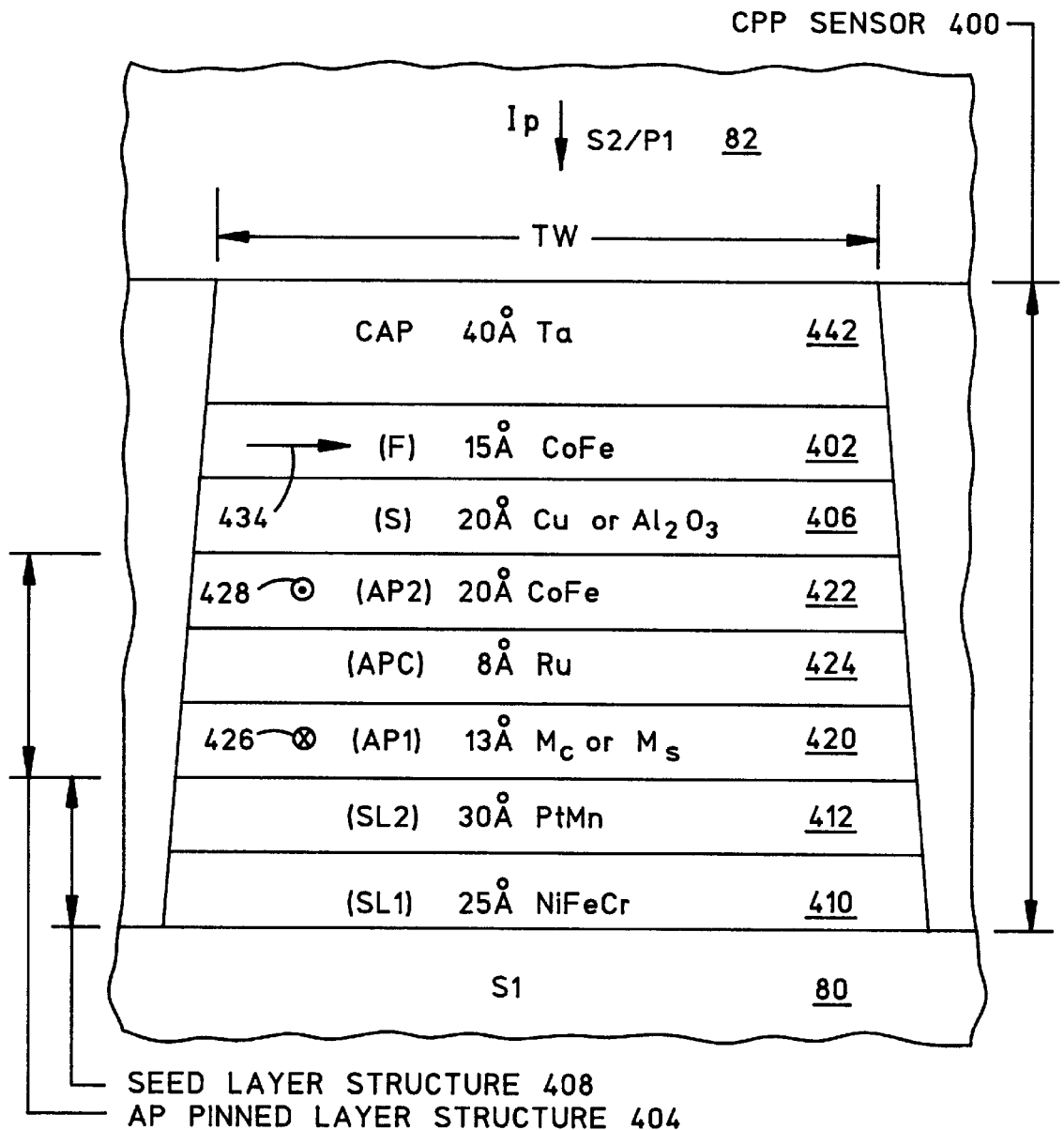
FIG. 12 is an ABS illustration of a first embodiment of the present single CPP sensor.

Another embodiment of the present CPP sensor 400, which is a single CPP sensor, is illustrated in FIG. 12 wherein the sensor is located between the first and second shield layers 80 and 82 which serve as first and second lead layers. The first and second shield layers 80 and 82 conduct a current $I_P$ through the sensor perpendicular to the major planes of the layers of the sensor. The sensor 400 includes a free layer 402 and an antiparallel (AP) pinned layer structure 404. A nonmagnetic electrically conductive or electrically nonconductive spacer layer (S) 406 is located between the free layer 402 and the AP pinned layer structure 404. Because the free layer 402 is located between the AP pinned layer structure 404 and the second shield layer 82 the sensor 400 is a bottom sensor. A seed layer structure 408 may be located between the first shield layer 80 and the AP pinned layer structure 204. The seed layer structure 408 may include first and second seed layers (SLY) and (SLY) 410 and 412. The seed layers, with the thicknesses and materials shown, have been found to promote a desirable texture of the layers deposited thereon. A cap layer 442 may be located on the free layer 402 to protect it from subsequent processing steps.

It should be noted that the spin valve sensor 400 does not include the typical antiferromagnetic (AFM) pinning layer for pinning magnetic moments of the AP pinned layer structure 404. The AP pinned layer structure 404 is self-pinning, as described hereinabove. The AP pinned layer structure 404 includes ferromagnetic first and second AP pinned layers (AP1) and (AP2) 420 and 422. A nonmagnetic electrically conductive antiparallel coupling (APC) layer 424 is located between and interfaces the first and second AP pinned layers 420 and 422. The first AP pinned layer 420 has a magnetic moment 426 which is oriented perpendicular to the ABS in a direction, either toward the ABS or away from the ABS, as shown in FIG. 12, and the second AP pinned layer has a magnetic moment 428 which is oriented antiparallel to the magnetic moment 426 by a strong antiparallel coupling between the first and second AP pinned layers 420 and 422.

Figure 13:
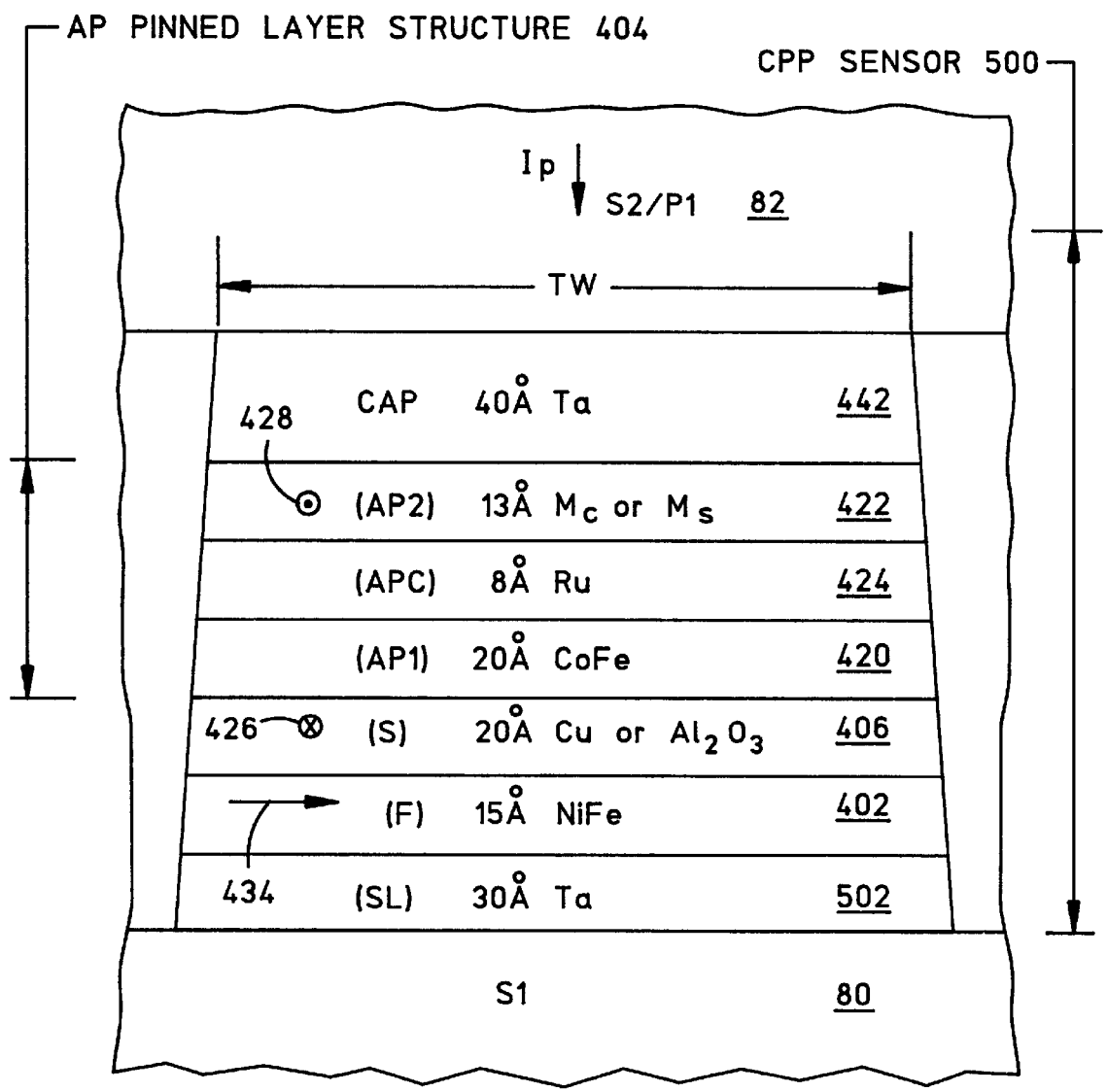
FIG. 13 is an ABS illustration of a second embodiment of the present single CPP sensor.

Another embodiment of a single CPP sensor 500 is illustrated in FIG. 13. The spin valve sensor 500 includes the free layer 402, the antiparallel (AP) pinned layer structure 404 and the spacer layer (S) 406 which is located between and interfaces the free layer 402 and the AP pinned layer structure 404. The free layer 402 has a magnetic moment 434 which is parallel to the ABS and parallel to the major planes of the sensor in a direction from right to left or from left to right, as shown in FIG. 13. The sensor 500 in FIG. 13 is known in the art as a top CPP sensor since the AP pinned layer structure 404 is located between the free layer 402 and the second shield/first pole piece layer 82.

The AP pinned layer structure 404 includes the ferromagnetic first and second AP pinned layers (AP1) and (AP2) 420 and 422 and the antiparallel coupling (APC) layer 424 which is located between and interfaces the first and second AP pinned layers 420 and 422. The AP pinned layers 420 and 422 have magnetic moments 426 and 428 which are oriented perpendicular to the ABS and antiparallel with respect to one another. The operation of the sensor 500 in response to field signals from the rotating magnetic disk is the same as that described hereinabove for the spin valve sensor 400 in FIG. 12.

In each of the sensors 400 and 500 the second AP pinned layer 422 may be composed of either a magnetocrystalline material ($M_C$) or a positive magnetostriction material ($+M_S$) as discussed hereinabove. The spacer layer 406 in each of the sensors 400 and 500 may be copper (Cu) or aluminum oxide ($Al_2O_3$) for a CPP spin valve sensor or a tunnel junction sensor respectively as discussed hereinabove. For the CPP sensor the perpendicular current $I_P$ is a sense current and for the tunnel junction sensor the perpendicular current $I_P$ is a tunneling current as discussed hereinabove. The materials and thicknesses for the other layers in the sensors 400 and 500 may be the same as shown for the sensors 200 and 300 in FIGS. 10 and 11.

Figure 14:
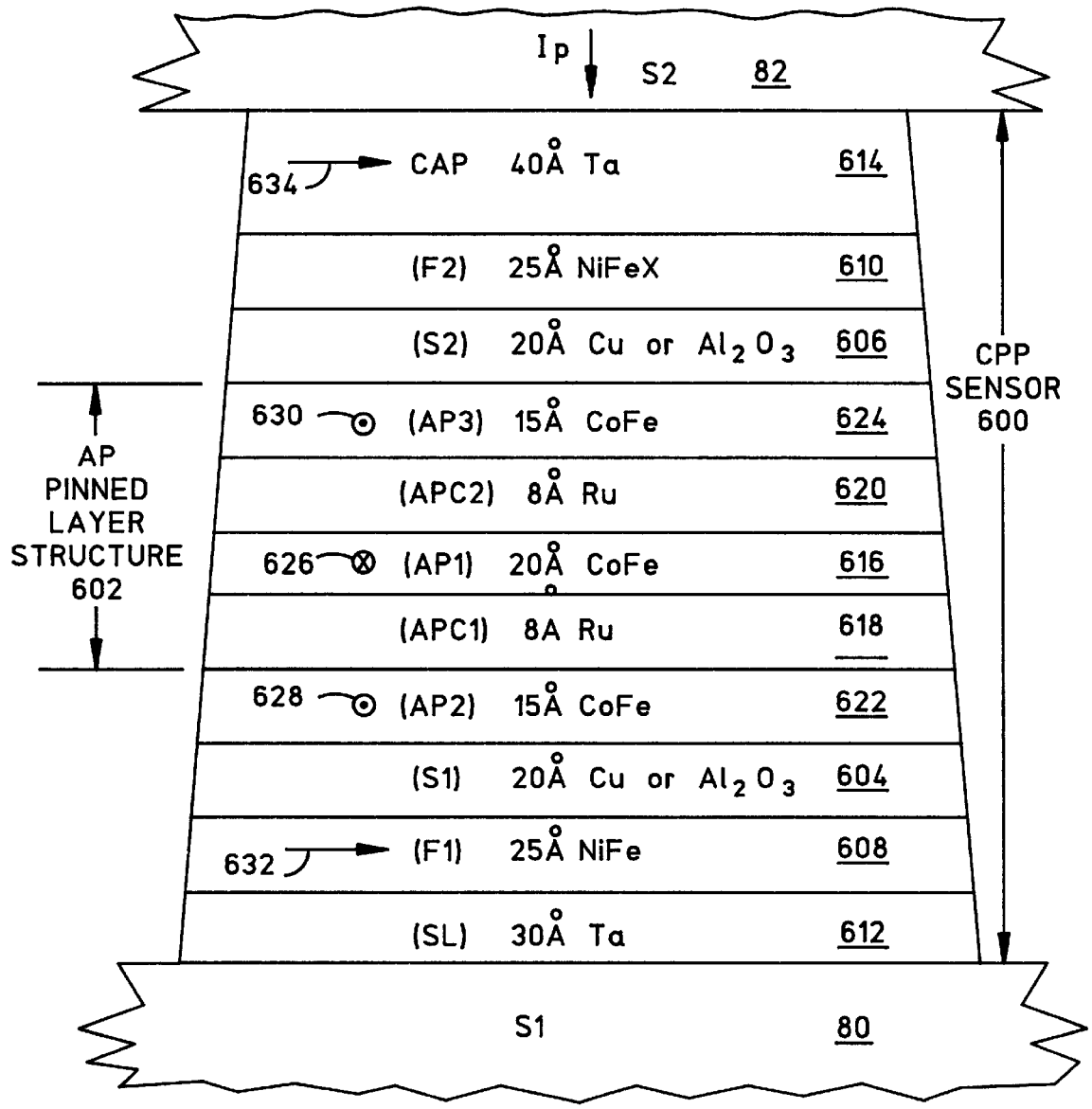
FIG. 14 is an ABS illustration of a dual spin valve sensor wherein an AP pinned layer structure is located between first and second free layer structures.

FIG. 14 is an ABS illustration of a dual CPP sensor 600, but differs in its dual capacity from the aforementioned dual CPP sensors in that an AP pinned layer structure 602 is located between first and second spacer layers (S1) and (S2) 604 and 606. The first and second spacer layers 604 and 606 are, in turn, located between first and second free layers (Fi) and (Fi) 608 and 610. The first and second shield layers 80 and 82 may be electrically connected to the sensor for conducting a perpendicular current ($I_P$) perpendicular to the major thin film surfaces of the layers of the sensor. A seed layer 612 may be located between the first shield layer 80 and the first free layer 608 and a cap layer 614 may be located between the second free layer 610 and the second shield layer 82.

The AP pinned layer structure 602 has a first AP pinned layer (AP1) 616 which is located between first and second antiparallel coupling layers (APC) and (APC) 618 and 620. In turn, the antiparallel coupling layers 618 and 620 are located between second and third AP pinned layers (AP2) and (APE) 622 and 624. If the magnetic moment 626 of the first AP pinned layer is oriented perpendicular to the ABS into the sensor then the magnetic moments 628 and 630 of the second and third AP pinned layers will be oriented antiparallel thereto. For self-pinning the AP pinned layer structure 602 the material of the first AP pinned layer 616 may be either the compositions discussed for the first and second aspects of the materials of the second AP pinned layers described hereinabove. By employing three AP pinned layers the second and third AP pinned layers 622 and 624 are in-phase so that rotations of the magnetic moments 632 and 634 of the first and second free layers will combine to provide a high magnetoresistive coefficient dr/R. In the dual CPP sensor in FIG. 14 the pinning layers are likewise omitted because of the self-pinning structure so that the read gap is narrowed and the resistance of the sensor is lessened as discussed hereinabove. Exemplary materials and thicknesses for the layers not already discussed are shown in FIG. 14.

Discussion

Figure 8:
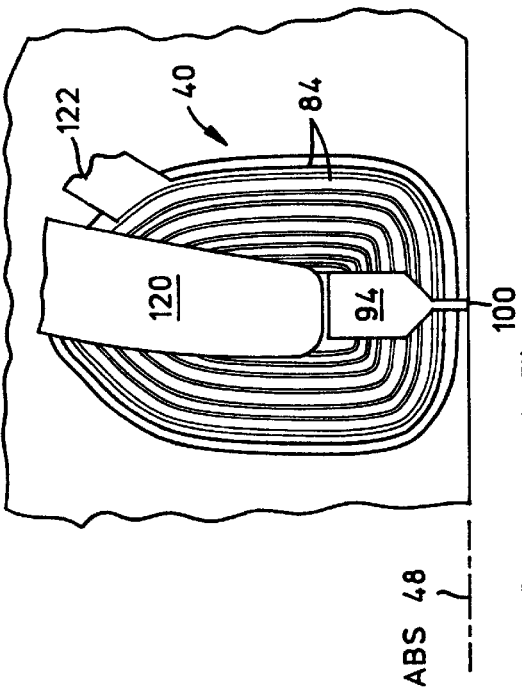
FIG. 8 is a view taken along plane 8—8 of FIG. 6 with all material above the coil layer and leads removed.

It should be understood that any of the sensors 200, 300, 400, 500 or 600 may be employed in lieu of the sensor 74 in FIG. 9 with the hard bias layers 134 and 136 longitudinally stabilizing any of the free layers. The read head, in turn, may be used in a magnetic head assembly as shown in FIGS. 6, 7 and 8 and in a magnetic disk drive as shown in FIGS. 1 and 3. It should also be understood that the seed layers and/or cap layer shown for the sensors 400 and 500 in FIG. 13 may also be employed for the sensors 200 and 300 in FIGS. 10 and 11. Further, instead of using the first and second shield layers 80 and 82 as leads, separate first and second leads may be employed as desired. It should further be understood that the invention may be employed in a tape drive instead of a disk drive in which case the head surface contacts a linearly moving tape and does not have an air bearing surface.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic head assembly, which has a head surface for facing a magnetic medium, comprising:
a CPP sensor including:
first and second antiparallel (AP) pinned layer structures wherein each AP pinned layer structure is self pinned without the assistance of a pinning layer;
each of the first and second AP pinned layer structures having at least first and second antiparallel (AP) pinned layers and at least one antiparallel (AP) coupling layer with the AP coupling layer being located between the first and second AP pinned layers;
a free layer that has a magnetic moment that is oriented parallel to the head surface and parallel to major planes of the AP pinned layers;
a first spacer layer located between the first AP pinned layer structure and the free layer and a second spacer layer located between the second AP pinned layer structure and the free layer;
the first AP pinned layer of the first AP pinned layer structure interfacing the first spacer layer and the first AP pinned layer of the second AP pinned layer structure interfacing the second spacer layer;
each of the first and second AP pinned layers having a magnetic moment that is oriented perpendicular to the head surface; and
the magnetic moments of the first AP pinned layers of the first and second AP pinned layer structures being parallel with respect to one another and in a same direction, the magnetic moments of second AP pinned layers of the first and second AP pinned layer structures being parallel with respect to one another and in a same direction and the magnetic moments of the first AP pinned layers being antiparallel to the magnetic moments of the second AP pinned layers.

2. A magnetic head assembly as claimed in claim 1 wherein each of the second AP pinned layers is composed of a material that has a high magnetocrystalline anisotropy.

3. A magnetic head assembly as claimed in claim 2 wherein each of the second AP pinned layers is composed of a material that is selected from the group consisting of Co, $Co_{75}Pt_{25}$ and $Co_{80}Sm_{20}$.

4. A magnetic head assembly as claimed in claim 3 wherein the first and second spacer layers are composed of copper or the first and second spacer layers are composed of aluminum oxide.

5. A magnetic head assembly as claimed in claim 4 further comprising:
a write head including:
ferromagnetic first and second pole piece layers which each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

6. A magnetic head assembly as claimed in claim 1 wherein each of the second AP pinned layers is composed of a material that has a high magnetostriction.

7. A magnetic head assembly as claimed in claim 6 wherein each of the second AP pinned layers is composed of a material that is selected from the group consisting of $Co_{50}Fe_{50}$ and $Ni_{45}Fe_{55}$.

8. A magnetic head assembly as claimed in claim 7 wherein the first and second spacer layers are composed of copper or the first and second spacer layers are composed of aluminum oxide.

9. A magnetic head assembly as claimed in claim 8 further comprising:
a write head including:

ferromagnetic first and second pole piece layers which each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions.

10. A magnetic disk drive that has a head surface for facing a magnetic medium and that has at least one magnetic head assembly that includes a write head and a read head comprising:

the write head including:
ferromagnetic first and second pole piece layers that each have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; the read head including:
ferromagnetic first and second shield layers; and
a CPP sensor located between the first and second shield layers; the CPP sensor including:
first and second antiparallel (AP) pinned layer structures wherein each AP pinned layer structure is self pinned without the assistance of a pinning layer;
each of the first and second AP pinned layer structures having at least first and second antiparallel (AP) pinned layers and at least one antiparallel (AP) coupling layer with the AP coupling layer being located between the first and second AP pinned layers;
a free layer that has a magnetic moment that is oriented parallel to the head surface and parallel to major planes of the AP pinned layers;
a first spacer layer located between the first AP pinned layer structure and the free layer and a second spacer layer located between the second AP pinned layer structure and the free layer;
the first AP pinned layer of the first AP pinned layer structure interfacing the first spacer layer and the first AP pinned layer of the second AP pinned layer structure interfacing the second spacer layer;
each of the first and second AP pinned layers having a magnetic moment that is oriented perpendicular to the head surface; and
the magnetic moments of the first AP pinned layers of the first and second AP pinned layer structures being parallel with respect to one another and in a same direction, the magnetic moments of second AP pinned layers of the first and second AP pinned layer structures being parallel with respect to one another and in a same direction and the magnetic moments of the first AP pinned layers being antiparallel to the magnetic moments of the second AP pinned layers;

a housing;
the magnetic medium being supported in the housing;
a support mounted in the housing for supporting the magnetic head assembly with said head surface facing the magnetic medium so that the magnetic head assembly is in a transducing relationship with the magnetic medium;
a motor for moving the magnetic medium; and
a processor connected to the magnetic head assembly and to the motor for exchanging signals with the magnetic head assembly and for controlling movement of the magnetic medium.

11. A magnetic disk drive as claimed in claim 10 wherein each of the second AP pinned layers is composed of a material that has a high magnetocrystalline anisotropy.

12. A magnetic disk drive as claimed in claim 11 wherein each of the second AP pinned layers is composed of a material that is selected from the group consisting of Co, $Co_{75}Pt_{25}$ and $Co_{80}Sm_{20}$.

13. A magnetic disk drive as claimed in claim 12 wherein the first and second spacer layers are composed of copper or the first and second spacer layers are composed of aluminum oxide.

14. A magnetic disk drive as claimed in claim 10 wherein each of the second AP pinned layers is composed of a material that has a high magnetostriction.

15. A magnetic disk drive as claimed in claim 14 wherein each of the second AP pinned layers is composed of a material that is selected from the group consisting of $Co_{50}Fe_{50}$ and $Ni_{45}Fe_{55}$.

16. A magnetic disk drive as claimed in claim 15 wherein the first and second spacer layers are composed of copper or the first and second spacer layers are composed of aluminum oxide.

17. A method of making a magnetic head assembly that has a head surface for facing a magnetic medium, comprising the steps of:

a method of making a CPP sensor including the steps of:
forming first and second antiparallel (AP) pinned layer structures wherein each AP pinned layer structure is self pinned without the assistance of a pinning layer;
forming each of the first and second AP pinned layer structures with at least first and second antiparallel (AP) pinned layers and at least one antiparallel (AP) coupling layer with the AP coupling layer being located between the first and second AP pinned layers;
forming a free layer that has a magnetic moment that is oriented parallel to the head surface and parallel to major planes of the AP pinned layers;
forming a first spacer layer between the first AP pinned layer structure and the free layer and forming a second spacer layer between the second AP pinned layer structure and the free layer;
forming the first AP pinned layer of the first AP pinned layer structure interfacing the first spacer layer and the first AP pinned layer structure of the second AP pinned layer structure interfacing the second spacer layer;
forming each of the first and second AP pinned layers with a magnetic moment that is oriented perpendicular to the head surface; and
forming the magnetic moments of the first AP pinned layers of the first and second AP pinned layer structures parallel with respect to one another and in a same direction, the magnetic moments of second AP pinned layers of the first and second AP pinned layer structures parallel with respect to one another and in a same direction and the magnetic moments of the first AP pinned layers antiparallel to the magnetic moments of the second AP pinned layers.

18. A method as claimed in claim 17 wherein each of the second AP pinned layers is formed of a material that has a high magnetocrystalline anisotropy.

19. A method as claimed in claim 18 wherein each of the second AP pinned layers is formed of a material that is selected from the group consisting of Co, $Co_{75}Pt_{25}$ and $Co_{80}Sm_{20}$.

20. A method as claimed in claim 19 further comprising the steps of:
   a method of making a write head comprising the steps of:
      forming ferromagnetic first and second pole piece layers which each have a yoke portion located between a pole tip portion and a back gap portion;
      forming a nonmagnetic write gap layer located between the pole tip portions of the first and second pole piece layers;
      forming an insulation stack with at least one coil layer embedded therein between the yoke portions of the first and second pole piece layers; and
      connecting the first and second pole piece layers at their back gap portions.

21. A method as claimed in claim 17 wherein each of the second AP pinned layers is formed of a material that has a high magnetostriction.

22. A method as claimed in claim 21 wherein each of the second AP pinned layers is formed of a material that is selected from the group consisting of $Co_{50}Fe_{50}$ and $Ni_{45}Fe_{55}$.

23. A method as claimed in claim 22 further comprising the steps of:
   a method of making a write head comprising the steps of:
      forming ferromagnetic first and second pole piece layers which each have a yoke portion located between a pole tip portion and a back gap portion;
      forming a nonmagnetic write gap layer located between the pole tip portions of the first and second pole piece layers;
      forming an insulation stack with at least one coil layer embedded therein between the yoke portions of the first and second pole piece layers; and
      connecting the first and second pole piece layers at their back gap portions.

24. A magnetic head assembly, that has a head surface for facing a magnetic medium, comprising:
   a read head that includes a CPP sensor;
   the CPP sensor including:
      an antiparallel (AP) pinned layer structure;
      a ferromagnetic free layer having a magnetic moment that is free to rotate in response to a field signal; and
      a spacer layer located between the free layer and the AP pinned layer structure; the antiparallel (AP) pinned layer structure including:
         ferromagnetic first and second antiparallel (AP) pinned layers;
         an antiparallel coupling (APC) layer located between and interfacing the first and second AP pinned layers;
         the first and second AP pinned layers self pinning one another without assistance of an antiferromagnetic (AFM) pinning layer; and
         first and second leads connected to the sensor for conducting a current through the sensor perpendicular to major planes of the layers of the sensor.

25. A magnetic head assembly as claimed in claim 24 wherein the second AP pinned layer is composed of a material that has a high magnetocrystalline anisotropy.

26. A magnetic head assembly as claimed in claim 25 wherein the second AP pinned layer is composed of a material that is selected from the group consisting of Co, $Co_{75}Pt_{25}$ and $Co_{80}Sm_{20}$.

27. A magnetic head assembly as claimed in claim 26 wherein the first AP pinned layer is composed of $Co_{90}Fe_{10}$.

28. A magnetic head assembly as claimed in claim 27 further comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions.

29. A magnetic head assembly as claimed in claim 24 wherein the second AP pinned layer is composed of a material that has a high magnetostriation.

30. A magnetic head assembly as claimed in claim 29 wherein the second AP pinned layer is composed of a material that is selected from the group consisting of $Co_{50}Fe_{50}$ and $Ni_{45}Fe_{55}$.

31. A magnetic head assembly as claimed in claim 30 wherein the first AP pinned layer is composed of $Co_{90}Fe_{10}$.

32. A magnetic head assembly as claimed in claim 31 further comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions.

33. A magnetic disk drive including at least one magnetic head assembly that has a head surface for facing a magnetic medium and that includes a write head and a read head, comprising:
   the write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; the read head including:
      ferromagnetic first and second shield layers; and
      a CPP sensor located between the first and second shield layers; the CPP sensor including:
         an antiparallel (AP) pinned layer structure;
         a ferromagnetic free layer having a magnetic moment that is free to rotate in response to a field signal; and
         a spacer layer located between the free layer and the AP pinned layer structure; the antiparallel (AP) pinned layer structure including;

ferromagnetic first and second antiparallel (AP) pinned layers;

an antiparallel coupling (APC) layer located between and interfacing the first and second AP pinned layers;

the first and second AP pinned layers self pinning one another without assistance of an antiferromagnetic (AFM) pinning layer; and first and second leads connected to the sensor for conducting a current through the sensor perpendicular to major planes of the layers of the sensor;

a housing;

the magnetic medium being supported in the housing;

a support mounted in the housing for supporting the magnetic head assembly with said head surface facing the magnetic medium so that the magnetic head assembly is in a transducing relationship with the magnetic medium;

a motor for moving the magnetic medium; and a processor connected to the magnetic head assembly and to the motor for exchanging signals with the magnetic head assembly and for controlling movement of the magnetic medium.

34. A magnetic disk drive as claimed in claim 33 wherein the second AP pinned layer is composed of a material that has a high magnetocrystalline anisotropy.

35. A magnetic disk drive as claimed in claim 33 wherein the second AP pinned layer is composed of a material that has a high magnetostriction.

36. A method of making a magnetic head assembly, which has a head surface for facing a magnetic medium, comprising the steps of:

forming a read head that includes a CPP sensor;

a making of the CPP sensor including the steps of:

forming an antiparallel (AP) pinned layer structure;

forming a ferromagnetic free layer that has a magnetic moment that is free to rotate in response to a field signal; and forming a spacer layer between the free layer and the AP pinned layer structure; the forming of the antiparallel (AP) pinned layer structure including the steps of:

forming ferromagnetic first and second antiparallel (AP) pinned layers;

forming an antiparallel coupling (APC) layer between and interfacing the first and second AP pinned layers;

the first and second AP pinned layers being further formed to self pin one another without assistance of an antiferromagnetic (AFM) pinning layer; and forming first and second leads connected to the sensor for conducting a current through the sensor perpendicular to major planes of the layers of the sensor.

37. A method as claimed in claim 36 wherein each of the second AP pinned layers is formed of a material that has a high magnetocrystalline anisotropy.

38. A method as claimed in claim 37 wherein the second AP pinned layer is formed of a material that is selected from the group consisting of Co, $Co_{75}Pt_{25}$ and $Co_{80}Sm_{20}$.

39. A method as claimed in claim 38 wherein the first AP pinned layer is formed of $Co_{90}Fe_{10}$.

40. A method as claimed in claim 36 wherein the second AP pinned layer is formed of a material that has a high magnetostriction.

41. A method as claimed in claim 40 wherein the second AP pinned layer is formed of a material that is selected from the group consisting of $Co_{50}Fe_{50}$ and $Ni_{45}Fe_{55}$.

42. A method as claimed in claim 41 wherein the first AP pinned layer is formed of $Co_{90}Fe_{10}$.

* * * * *